Aug. 26, 1941.   C. K. SKINNER   2,253,989
ROTATIONAL WASHER
Filed Feb. 11, 1939
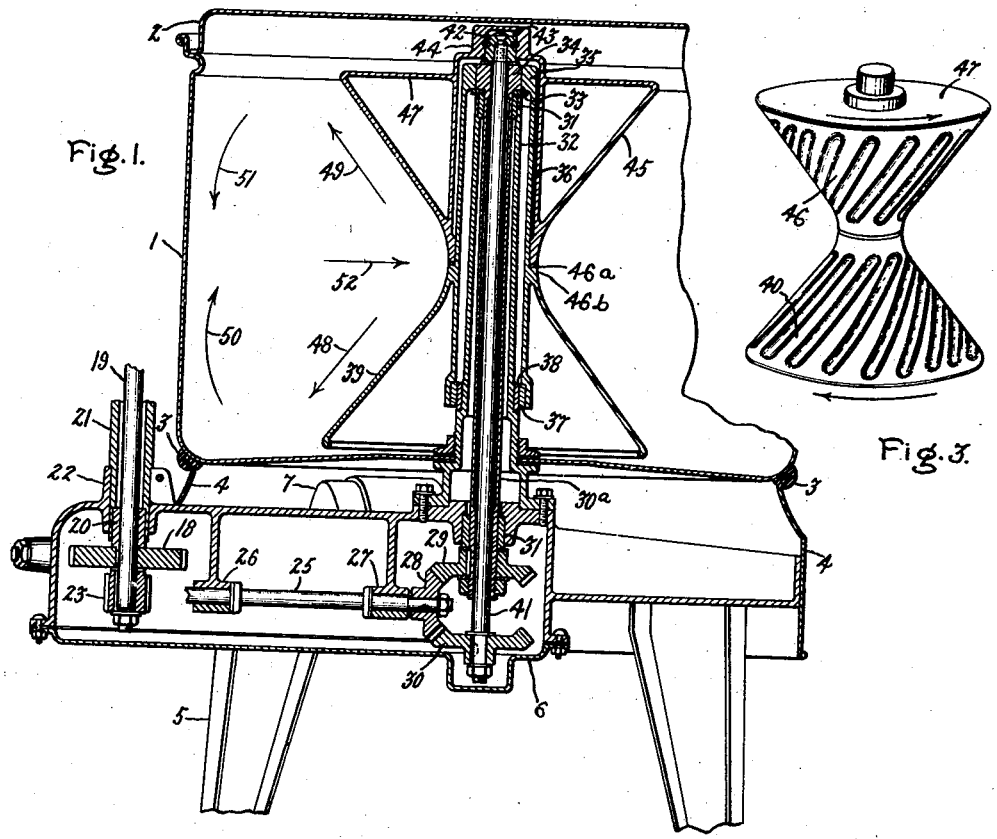
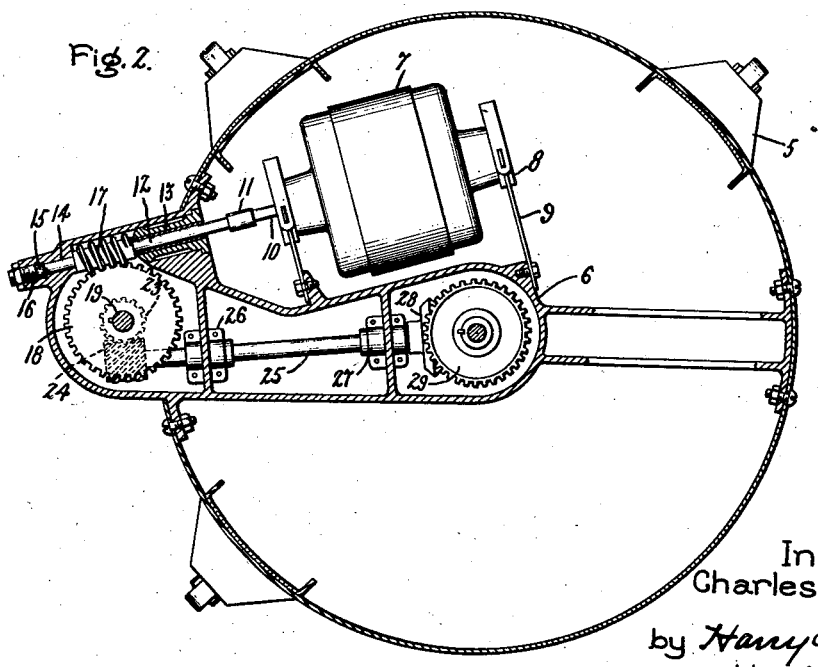
Inventor:
Charles K. Skinner,
by Harry E. Dunham
His Attorney.

Patented Aug. 26, 1941

2,253,989

UNITED STATES PATENT OFFICE 2,253,989

ROTATIONAL WASHER

Charles K. Skinner, Southport, Conn., assignor to General Electric Company, a corporation of New York Application February 11, 1939, Serial No. 255,924

2 Claims. (Cl. 68—89)

The present invention relates to washing machines of the type having rotating washing elements or agitators.

The object of my invention is to provide an improved construction and arrangement in washing machines of this type, and for a consideration of what I believe novel and my invention attention is directed to the following description and the claims appended thereto.

In the accompanying drawing, Fig. 1 is a sectional elevation of a washing machine embodying my invention; Fig. 2 is a sectional plan view of the driving mechanism; and Fig. 3 is a perspective view of the washing elements.

Referring to the drawing, there is shown a washing machine having a corrosion-resistant sheet metal tub 1 provided with a cover 2 and resting on a rubber bead 3 on the upper edge of a cylindrical skirt 4 to which are attached supporting legs 5. Extending diametrically across the skirt and fixed at each end thereto is a gear case 6 on which an electric motor 7 is resiliently supported by rubber rings 8 clamped to supports 9 fixed to the gear case. The motor shaft 10 is connected by a flexible coupling 11 to a worm shaft 12 journaled in bearings 13 and 14 in the gear case. The end thrust of the worm shaft is taken by a thrust ball 15 bearing against an adjustable plug 16 threaded in the gear casing. A worm 17 formed on the worm shaft meshes with a worm gear 18 keyed to the lower end of a vertical shaft 19 journaled in a bearing 20 in a wringer post 21 clamped in a boss 22 in the top wall of the gear casing. The shaft 19 is adapted to drive a wringer mounted on the upper end of the wringer post 21. Keyed on the shaft 19 below the worm gear 18 is a pinion 23 meshing with a gear 24 fixed on one end of a horizontal shaft 25 journaled respectively in bearings 26 and 27. Fixed on the opposite end of the shaft 25 is a bevel gear 28 meshing with upper and lower bevel gears 29 and 30.

The bevel gear 29 is keyed on a hollow or tubular shaft 30a journaled in a bearing 31 in the top wall of the gear casing and extending up through a tubular post 32 fixed to the top of the gear casing. The upper end of the shaft 30a is journaled in a bearing 31 at the top of the post and is supported thereon by a thrust washer 33. On the upper end of the shaft 30a is a nut 34 fitting in a socket 35 in the cylindrical hub of an agitator 36. The hub depends around the post 32 and at its lower end has a bearing 37 fixed therein bearing on a sleeve 38 fixed on the post. Integral with the hub is a conical skirt 39 flaring downwardly and outwardly toward the bottom of the tub and having spirally arranged ribs 40 on the outer surface thereof. During rotation the ribs 40 have a rubbing action on the clothes and also serve as liquid circulating vanes.

The gear 30 is keyed to the lower end of a shaft 41 extending up through the tubular shaft 30 and journaled therein. On the upper end of the shaft is a nut 42 fitting in a socket 43 in the hub 44 of an agitator 45. The agitator 45 has an outwardly and upwardly flaring conical surface with spirally arranged ribs 46 thereon. The top wall 47 extends slightly above the normal water level. The agitator 45 is journaled on the hub of the agitator 36 and is supported thereon by a thrust washer 46a on a shoulder 46b on the agitator.

With this arrangement the upper and lower agitators are rotated at the same speed and in opposite directions. In the operation the clothes and liquid in contact with the agitators are subjected to a rubbing action by the ribs 40 and 46. Due to the conical surfaces of the agitators, the clothes are also impelled outward by centrifugal force along the surfaces in the direction of the arrows 48 and 49. At the same time the clothes are given a circulating movement around the tub due to the rotation of the agitator. The clothes at the bottom of the tub will be rotated in the direction of the agitator 36, and the clothes at the top of the tub will be rotated in the direction of the agitator 45. In the horizontal plane midway between the agitators, the clothes will have substantially no rotation. Due to the outward movement of the clothes at the top and bottom of the tub, the clothes will be moved along the side walls of the tub in the direction of the arrows 50 and 51, and, upon meeting at the horizontal plane between the agitators, will be deflected inwardly in the direction of the arrow 52. This produces a circulation of the clothes in a vertical plane in opposite directions above and below the horizontal plane between the agitators. The net result is that the clothes are circulated so that all parts are brought into contact with the ribs of the agitators. Due to the opposite directions of rotation of the agitators, there is less tendency for the liquid and clothes in the tub to rotate with the agitators. This is important as the washing action is dependent upon the relative motion between the clothes and agitators. Another important aspect is the fact that the action of the agitators tends to maintain uniform distribution of the clothes and to prevent bunching of the clothes in regions out of contact with the agitators where there is no washing action. For example, an unbalanced distribution either toward the bottom or toward the top of the tub is corrected by the circulation in the direction of arrows 48 to 51 inclusive. An unbalanced distribution of clothes at the center of the tub will be corrected by the circulation in the direction of arrow 52 and by the settling of the clothes under the action of gravity to the region of influence of agitator 36. The correction of unbalanced distribution of the clothes is due to the fact that the agitators at the bottom and top of the tub both cause the clothes to move outward toward the sides of the tub and to the fact that the agitators rotate in opposite directions. From another aspect, one of the agitators can be considered as acting separately at either the top or the bottom of the tub and the other agitator can be considered as acting in a horizontal plane spaced from the first agitator to prevent unidirectional rotation of the liquid in the plane so as to prevent swirling of the liquid and clothes about the first agitator.

What I claim as new and desire to secure by Letters Patent of the United States is:

1. In a clothes washing machine, a tub, an agitator at the bottom of the tub rotatable about a vertical axis and having vanes flaring downward and outward toward the bottom of the tub, an agitator at the top of the tub having ribs flaring upward and outward toward the top of the tub, and means for unidirectionally rotating each agitator, the direction of rotation of one of the agitators being opposite that of the other agitator.

2. In a clothes washing machine, a tub, an agitator at the bottom of the tub rotatable about a vertical axis and having a conical surface flaring downward and outward toward the bottom of the tub, vanes on said surface, an agitator at the top of the tub rotatable about a vertical axis and having a conical surface flaring outward and upward toward the top of the tub, ribs on said surface, and means for unidirectionally rotating each agitator, the direction of rotation of one of the agitators being opposite that of the other agitator.

CHARLES K. SKINNER.